T. A. WILLARD.
STORAGE BATTERY JAR.
APPLICATION FILED AUG. 27, 1917.
1,327,649.
Patented Jan. 13, 1920.
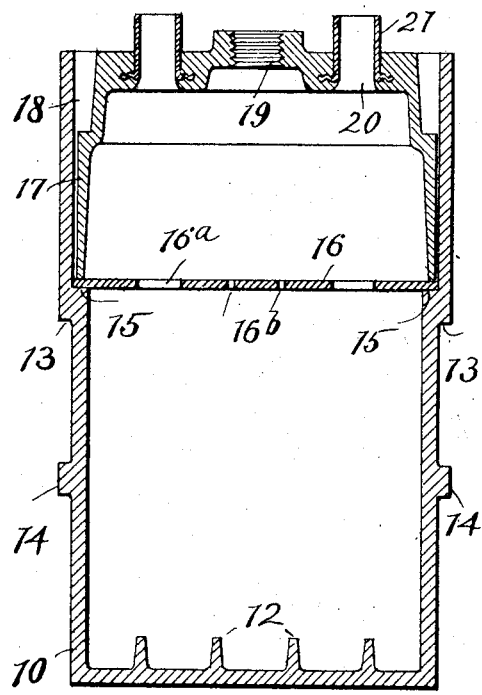
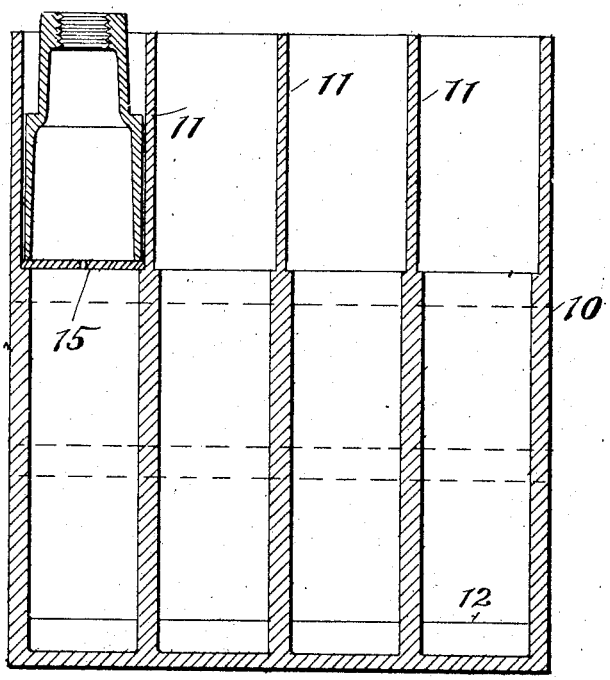
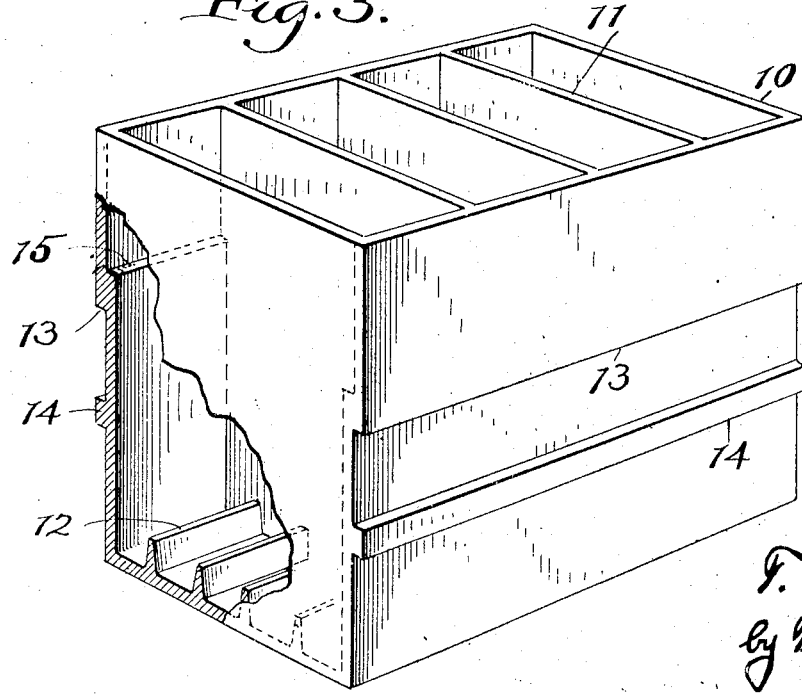
Inventor
T. A. Willard
by Thurston & Kwis
Attys

UNITED STATES PATENT OFFICE.

THEODORE A. WILLARD, OF EAST CLEVELAND, OHIO, ASSIGNOR TO WILLARD STORAGE BATTERY COMPANY, OF CLEVELAND, OHIO, A CORPORATION OF WEST VIRGINIA.

STORAGE-BATTERY JAR.

1,327,649.

Specification of Letters Patent.

Patented Jan. 13, 1920.

Application filed August 27, 1917. Serial No. 188,297.

*To all whom it may concern:*

Be it known that I, THEODORE A. WILLARD, a citizen of the United States, residing at East Cleveland, in the county of Cuyahoga and State of Ohio, have invented a certain new and useful Improvement in Storage-Battery Jars, of which the following is a full, clear, and exact description.

This invention relates to storage battery jars, and has for its object to provide a jar adapted particularly for aeroplane use, this jar forming a part of the storage battery, the details of which are set forth and claimed in a companion application filed by me of even date herewith.

The invention of this application resides in certain structural features of the jar which allow the jar, without the necessity for any additional container, to be firmly attached to the frame of an aeroplane, with minimum weight and size for a given capacity or output. The invention comprises certain other features of construction which enter into or form a part of a support for a chamber into which the acid of the battery may run very slowly when the battery is turned on its side or upside down.

The invention may be further briefly summarized as consisting in certain novel details of construction and combinations and arrangements of parts which will be described in the specification and set forth in the appended claims.

In the accompanying sheet of drawings, Figure 1 is a transverse sectional view through one compartment of the jar, showing in addition the cover and diaphragm which form the receiver into which the acid from the battery slowly runs if the battery is turned on its side or upside down; Fig. 2 is a longitudinal sectional view of the same; and Fig. 3 is a perspective view with parts broken away to show the interior construction.

The jar 10 constituting the subject matter of this invention is preferably formed of rubber by a molding process, and as here shown, is a multi-compartment jar having transverse partitions 11 which extend from the top to the bottom of the jar, dividing the latter into compartments, one for each cell of the battery, each compartment having on its base upstanding ribs 12 designed to support the elements of the cell.

By reference to Figs. 1 and 3 it will be observed that the upper part of the jar is offset outwardly, the offset portion extending along both sides, and if desired, along both ends, but as here shown, only along the sides. This offset forms along the sides of the jar between a half and a third of the distance down from the top, external shoulders 13. Below the shoulders 13 are external ribs 14 which are parallel to the shoulders 13, and in this case extend along the sides only of the jar, although they would extend entirely around the jar if the shoulders 13 are provided around the four sides of the jar. The shoulders 13 and the associated ribs 14 form along the sides of the jar grooves which are adapted to receive clamps which secure the jar to the aeroplane frame. In this manner I eliminate the necessity for the usual wood or any additional container than the jar itself and secure the battery firmly in position with minimum weight.

The offset previously referred to, also forms on the interior of the jar a short distance above the external shoulders 13, internal shoulders 15. These shoulders are extended all the way around the wall of each compartment, the end walls of the jar and the partitions 11 being offset along the plane of the shoulders 15 and being thinner above this plane than below it.

The internal shoulders of each compartment form a seat for a plate or diaphragm 16 which forms what may be termed a subcover for the compartment, and which together with a deep or skirted cover proper 17, form a chamber which receives the acid from the battery when the latter is inverted or turned on its side. In the drawings I have shown the diaphragm and cover for one cell only but it will be understood that each cell of the jar will be provided with similar parts. The diaphragm 16 extends across the compartment just above the plates of the battery, not here shown, and it is provided with openings $16^a$ through which the terminal posts of the battery extend.

Additionally it is provided with small openings 16ᵇ through which the acid may slowly leak into the upper chamber when the battery is inverted or turned on its side, as more fully explained in the companion application above referred to.

In practice the diaphragm is cemented to the shoulders 15 and is held down against the shoulders by the bottom of the cover member 17, which will be securely held in place by acid proof cement or sealing compound which will be poured into the space 18 between the upper part of the jar and the upper part of the cover member 17.

The cover member 17, as is explained more in detail in my companion application, is provided with a central opening 19 for a vent plug, and it is provided with openings 20 in which are embedded lead sealing sleeves 21 adapted to be lead burned to the terminal posts which extend upwardly from the battery elements. However, as the present invention resides in the jar or container proper, and not in the details of the vent plug, terminal posts and means for securing them in position, the latter are not illustrated and will not be further described.

Having described my invention, what I claim is:

1. A storage battery adapted particularly for aeroplane use and comprising a jar adapted to be supported independently of an outer casing, said jar comprising a one-piece body with lateral walls and dividing partitions forming a container for a number of cells, said jar body having on the lateral walls thereof means adapted to accommodate clamping means by which the jar may be rigidly supported.

2. A storage battery adapted particularly for aeroplane use, comprising a jar adapted to be supported independently of an outer casing and having lateral walls with integral partitions forming a one-piece body for a number of cells, said jar having along at least two of the lateral walls slots for accommodating a supporting clamp.

In testimony whereof I hereunto affix my signature.

THEODORE A. WILLARD.